Figure 1:
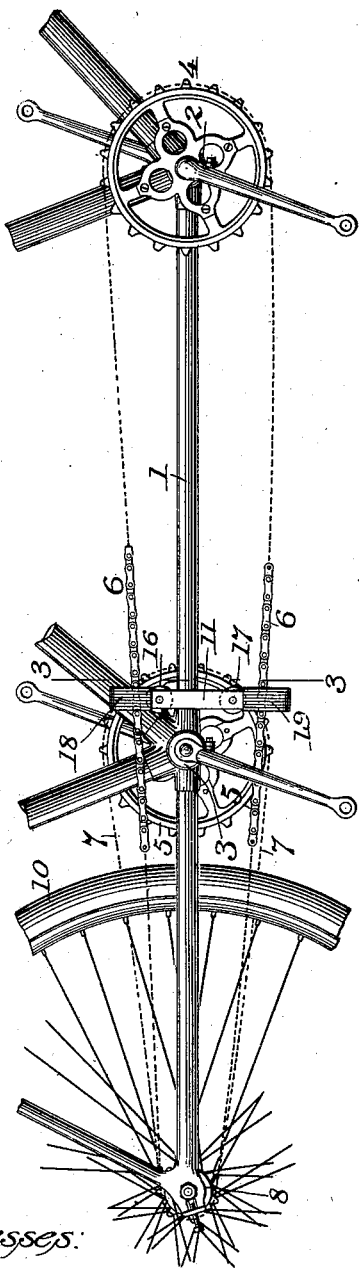

(No Model.)  
3 Sheets—Sheet 1.

D. W. CASWELL.
BICYCLE.

No. 601,122. Patented Mar. 22, 1898.

Witnesses:

Inventor:
Daniel W. Caswell (No Model.) 3 Sheets—Sheet 2.
D. W. CASWELL.
BICYCLE.

No. 601,122. Patented Mar. 22, 1898.

Witnesses.
Sidney P. Hollingsworth
Arthur Garner

Inventor:
Daniel W. Caswell,
by G. H. W. T. Howard
Attys.

(No Model.) 3 Sheets—Sheet 3.

D. W. CASWELL.
BICYCLE.

No. 601,122. Patented Mar. 22, 1898.

Witnesses:
Sidney P. Hollingsworth
Arthur Garner

Inventor:
Daniel W. Caswell,
by G. H. W. T. Howard
Atty.

UNITED STATES PATENT OFFICE.

DANIEL W. CASWELL, OF CHICAGO, ILLINOIS.

BICYCLE.

SPECIFICATION forming part of Letters Patent No. 601,122, dated March 22, 1898.

Application filed April 24, 1897. Serial No. 633,780. (No model.)

*To all whom it may concern:*

Be it known that I, DANIEL W. CASWELL, of the city of Chicago, in the county of Cook and State of Illinois, have invented certain new and useful Improvements in Bicycles, of which the following is a specification, reference being had to the accompanying drawings and to the numerals of reference marked thereon.

My invention relates to an improvement in bicycles, and more particularly to such as are of the "tandem" type. In certain constructions of bicycles of this description it is the practice to extend one chain from the forward sprocket to a sprocket on the rear crank-axle, another chain passing from a larger sprocket-wheel on the same axle to a sprocket on the hub of the rear or driving wheel. This arrangement of chains is in a measure objectionable, for the reason that the full power of the forward rider is not applied directly to the driving-wheel, but is transmitted through the driving mechanism operated by the second rider before reaching the driving-wheel. Another objection to this form of gearing arises from the unequal strain upon the bearings, the entire power being applied on one side only of the driving-wheel.

My invention may be employed in a tandem having chain transmission of the above character, but has reference more especially to another arrangement, in which there is a direct duplex-chain transmission, there being no chain connection between one crank-shaft and the other, a separate chain running from each crank-shaft to the rear or driving-wheel, on which there are two sprockets, one on the right and the other on the left side. In the latter arrangement of chain-gearing the chain from the front sprocket-wheel runs directly to the sprocket on the right side and the chain from the rear sprocket-wheel to the sprocket on the left side of the driving-wheel, each rider applying his full power directly to the rear or driving wheel by means of a separate chain. Under this construction there can be no twisting of the frame or cramping of bearings, it being seen that each crank-shaft does its work independently and in the same manner as in a wheel for a single rider, the driving-wheel receiving the power on both sides equally, so that the strain is not one-sided, and each row of balls doing its share of the work without crowding or cramping. In this arrangement of chain transmission it becomes necessary to use a long chain from the sprocket-wheel of the front crank-axle to the sprocket on the rear wheel, and my present invention relates more specifically to a guide, idler, or what may be termed in a certain sense a "support" employed in connection with the long chain to prevent its vibrating out of line and striking the frame or crank. My invention is not limited to any particular construction or arrangement of such guide, idler, or support provided it is so combined with the frame in the proper relation to a chain of a tandem bicycle as to prevent the vibration of the chain out of the true line or coming in contact with the frame, crank, or other part of the machine. Preferably the device is such that when the chain is under tension, as in riding, it shall center itself in the idler or guide without touching it at any point, the production of friction being thereby avoided, although it is within the scope of my invention that the idler or guide may, when the chain is at rest, support it, thus preventing sag or drop of the chain.

Figure 2:
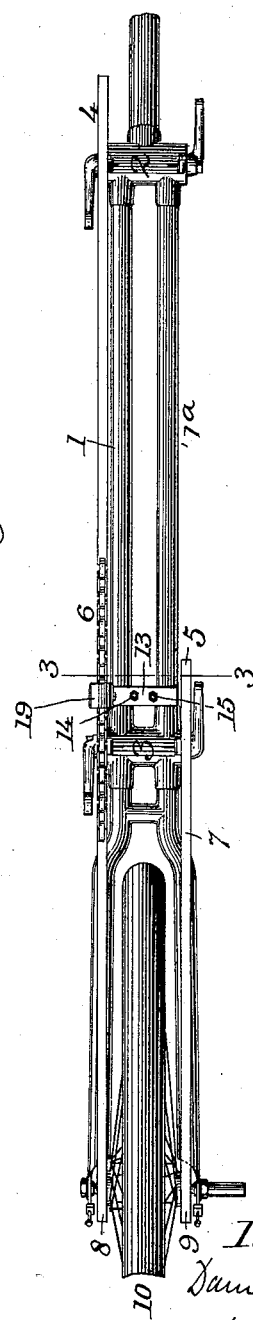
Figure 3:
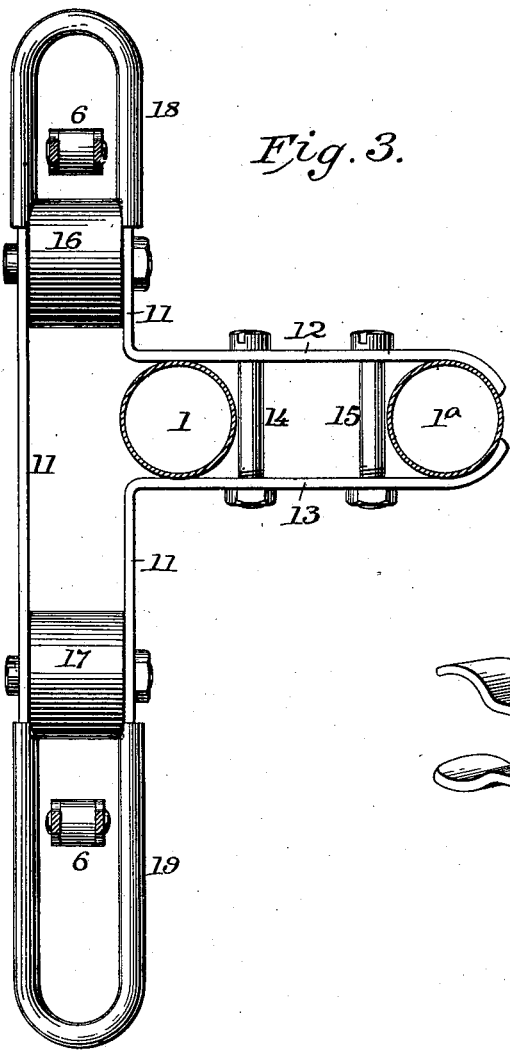
Figure 4:
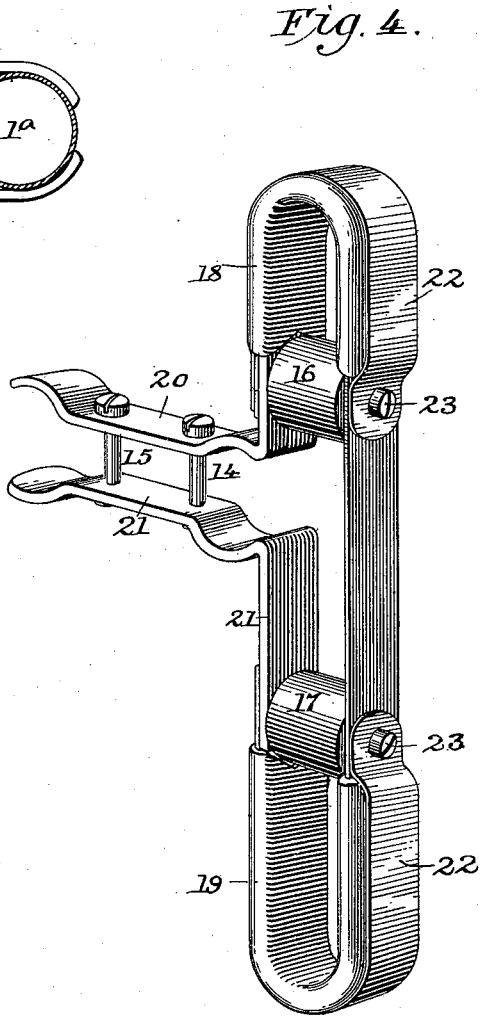
Figure 7:
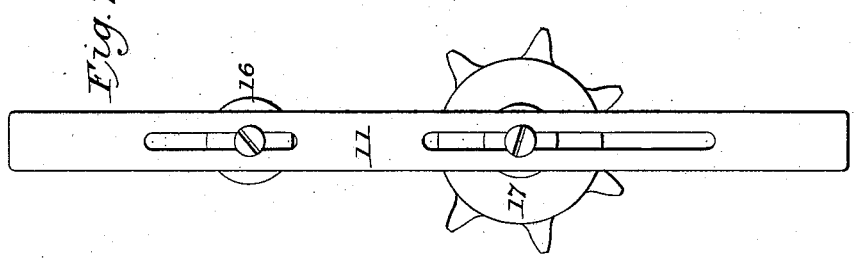
Figure 6:
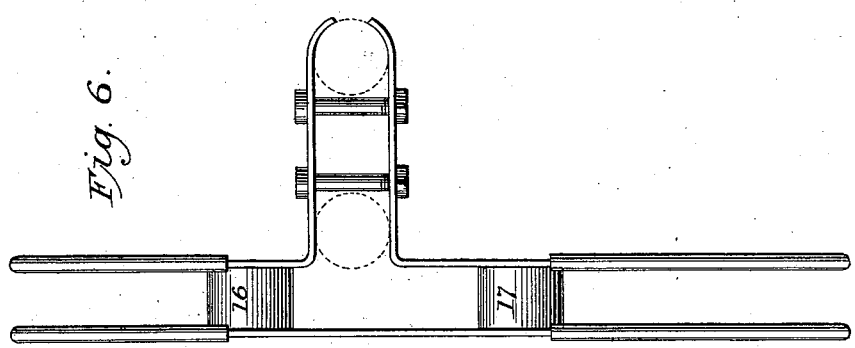
Figure 5:
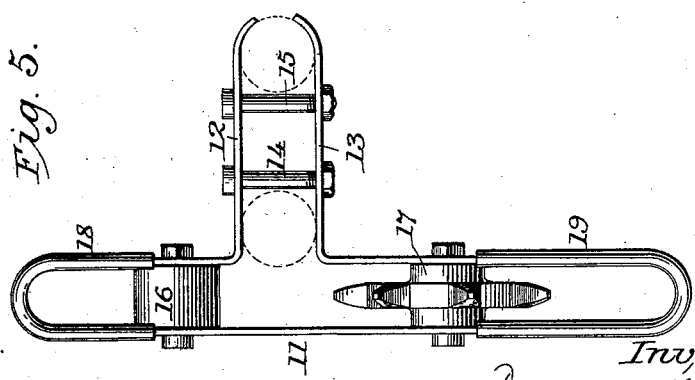

Referring to the drawings, Figure 1 is a side elevation of a portion of a tandem bicycle having my invention embodied therein. Fig. 2 is a bottom view of the same. Fig. 3 is a cross-section on the line 3 3, Figs. 1 and 2. Fig. 4 is a perspective detached view of the idler, guide, or support in one form. Figs. 5, 6, and 7 show modifications.

Similar numerals of reference indicate similar parts in the respective figures.

The forward crank-hanger 2 and the rear crank-hanger 3 are connected by tubular bars 11$^a$, which form parts of the frame of the bicycle. Through each crank-hanger passes a crank-axle, the forward one of which carries a sprocket-wheel 4, while to the rear axle is secured, on the opposite side of the bicycle, a similar sprocket-wheel 5. Chains 6 and 7 connect the sprocket-wheels 4 and 5 with sprockets 8 and 9 on the respective sides of the rear driving-wheel 10.

Heretofore the use of a long driving-chain—such, for example, as that shown at 6—has been found objectionable, because its length and weight were such that the act of tightening it sufficiently to prevent vibration placed such strain upon the chain and bearing that they would run hard and wear rapidly. On the other hand, when the chain was free enough to run easily the vibration would throw it out of a true line, which gave it a tendency to ride up on the teeth of the sprockets, causing rapid wear of and destruction to the chain and sprocket-teeth. To overcome such defects, I have devised an attachment to be fastened to the bicycle-frame and having openings through which the chain is free to pass and which prevents any undue vibration thereof. This device consists of a guide for the chain which extends rearwardly from the front sprocket-wheel either to a sprocket on the rear crank-axle or the driving-wheel, which device in its simplest form is made of a single piece 11 of strap metal about three-quarters of an inch wide. The metallic piece 11 is first bent into a long narrow loop closed at the top and bottom, the two ends 12 and 13 being afterward bent to a right angle to the loop and substantially parallel to each other and separated a distance equal to the diameter of the bars 1 1ᵃ of the bicycle-frame, as will be seen on reference to Figs. 3 and 4. Screw-bolts 14 15 pass through the ends 12 13 for the purpose of clamping the device to the bars 1 1ᵃ.

Rollers 16 17, mounted between the vertical sides of the loop, near the top and bottom thereof, respectively, are made, preferably, of leather, rubber, or similar material. The rollers may be allowed to revolve or not, as desired. Leather sheaths 18 19 surround the top and bottom of the loop, as seen, to deaden any slight noise that might result from the striking of the chain against the loop. The chain 6 passes through the loop over the upper roller 16 and below the lower one 17. This arrangement prevents the top stretch of the chain from dropping so low as to strike the frame or the bottom stretch from rising so high as to come in contact with the frame. The sides of the loop prevent lateral vibration of the chain and keep it in line at all times with the sprocket-wheels.

While my attachment may be formed of a single piece of metal, it may be constructed in two or more parts, as shown in Fig. 4. Here the loop is formed of a piece of metal bent as above described, and to the inner side or free ends are secured two pieces of heavier metal 20 21, which constitute the clamp for attaching the device to the frame. The pieces 20 21 are curved, as shown, to partly embrace the bars 1 1ᵃ, forming when bolted thereto a secure fastening. The rollers 16 17 are placed in the loop, and the ends of the loop are provided with leather sheaths, as above described, the outer surfaces of the sheaths being protected and ornamented by metallic plates 22, which are secured to the ends of the loops by the bolts 23, constituting the axes of the rollers 16 17. The rollers instead of being made of leather may be of metal, and the lower one may have teeth formed thereon, as seen in Fig. 5.

The metal parts are nickel-plated or made to conform to the decoration of the major part of the machine.

The attachment is hereinabove described as having loops; but it may be made in the form seen in Fig. 6, although this is not the preferred form, there being a danger should the chain become very loose of its getting beyond the ends of the attachment.

While this device is not designed as a chain-tightener, it is obvious that it may be adapted as such—as, for example, by mounting one or both of the rollers in slots, as seen in Fig. 7, and adjusting the roller or rollers so as to spread the chain.

It is also apparent that minor changes in construction may be made without departing from the spirit of my invention, and such may suggest themselves to the skilful mechanic.

Having described my invention, I claim—

1. A chain-guide for bicycles, comprising an elongated loop the bows of which inclose the upper and lower stretches of the chain, and a clamp projecting from the loop for securing it to the frame of a bicycle, combined with rollers journaled horizontally in the loop between the upper and lower stretches of the chain, substantially as set forth.

2. A chain-guide for bicycles, comprising an elongated loop the bows of which inclose the upper and lower stretches of the chain, and a clamp projecting from the loop for securing it to the frame of a bicycle, combined with rollers journaled horizontally in the loop between the upper and lower stretches of the chain, and sheaths covering the bows, substantially as set forth.

3. In a chain-guide for bicycles, a strip bent into two loops in line with each other, the ends of the strip being then turned outwardly between the loops to form a clamp, by means of which the guide is secured to the frame of a bicycle, in combination with rollers, 16, 17, substantially as set forth.

In testimony whereof I have hereunto set my hand and affixed my seal, at the said city of Chicago, this 12th day of April, 1897.

DANIEL W. CASWELL. [L. S.]

Witnesses:
R. F. BUNTING,
P. G. EMERY.